United States Patent
Lasaruk

(10) Patent No.: US 12,322,140 B2
(45) Date of Patent: Jun. 3, 2025

(54) METHOD FOR RECTIFICATION OF IMAGES AND/OR IMAGE POINTS, CAMERA-BASED SYSTEM AND VEHICLE

(71) Applicant: Continental Autonomous Mobility Germany GmbH, Ingolstadt (DE)

(72) Inventor: Aless Lasaruk, Meckenbeuren (DE)

(73) Assignee: Continental Autonomous Mobility Germany GmbH, Hannover (DE)

( * ) Notice: Subject to any disclaimer, the term of this patent is extended or adjusted under 35 U.S.C. 154(b) by 0 days.

(21) Appl. No.: 18/257,663

(22) PCT Filed: Dec. 1, 2021

(86) PCT No.: PCT/EP2021/083705
§ 371 (c)(1),
(2) Date: Jun. 15, 2023

(87) PCT Pub. No.: WO2022/128463
PCT Pub. Date: Jun. 23, 2022

(65) Prior Publication Data
US 2024/0054678 A1 Feb. 15, 2024

(30) Foreign Application Priority Data
Dec. 15, 2020 (EP) ................................ 20213975

(51) Int. Cl.
*G06T 7/80* (2017.01)
*G06V 20/56* (2022.01)
(52) U.S. Cl.
CPC ............. *G06T 7/80* (2017.01); *G06V 20/56* (2022.01); *G06T 2207/10016* (2013.01); *G06T 2207/30252* (2013.01)
(58) Field of Classification Search
CPC . G06T 15/06; G06T 7/80; G06T 2207/10016; G06T 2207/30252; G06V 20/56
See application file for complete search history.

(56) References Cited

U.S. PATENT DOCUMENTS

| | | | | |
|---|---|---|---|---|
| 8,396,251 B2* | 3/2013 | Mirbach | ................ | G06T 7/73 |
| | | | | 382/106 |
| 8,797,417 B2* | 8/2014 | Gayko | ................ | G06T 5/50 |
| | | | | 348/222.1 |

(Continued)

FOREIGN PATENT DOCUMENTS

| EP | 3293701 A1 | 3/2018 |
|---|---|---|
| FR | 3032820 A1 | 8/2016 |

(Continued)

OTHER PUBLICATIONS

European Search Report dated Jun. 21, 2021 for the counterpart European Patent Application No. 20213975.4.

(Continued)

*Primary Examiner* — Brian P Yenke

(57) ABSTRACT

A method for is disclosed for rectifying images and/or image points acquired by camera of a camera-based system of a vehicle with a windshield pane. A raw image of a scene is acquired with the camera. Raw image data is selected from the raw image. Intermediate image data is calculated based on the raw image data and camera parameters. The intermediate image data includes an intermediate image or intermediate image points. The intermediate image data resembles an image/image points of the scene obtained by a pinhole camera through the windshield pane. A set of points in space of the scene is calculated, the set of points corresponding to pixels of the intermediate image or to the intermediate image points. The calculation is performed using a parallel shift of the optical path induced by the windshield pane based on windshield pane parameters. Also disclosed is vehicle and a camera-based system therefor.

15 Claims, 3 Drawing Sheets

(56) References Cited

U.S. PATENT DOCUMENTS

| | | | |
|---|---|---|---|
| 11,897,517 B2* | 2/2024 | Sugiura | G06V 20/56 |
| 2014/0241589 A1* | 8/2014 | Weber | G06V 20/56 |
| | | | 382/108 |
| 2015/0145965 A1* | 5/2015 | Livyatan | G06F 18/22 |
| | | | 348/47 |
| 2016/0316192 A1* | 10/2016 | Kishiwada | B32B 17/10981 |
| 2017/0363416 A1* | 12/2017 | Ishimaru | G01B 11/002 |
| 2020/0117953 A1* | 4/2020 | Cooper | G06F 18/214 |
| 2020/0193643 A1* | 6/2020 | Hess | G06V 10/44 |
| 2023/0377245 A1* | 11/2023 | Laudereau | G06V 20/56 |
| 2023/0385995 A1* | 11/2023 | Laudereau | G06V 20/56 |
| 2023/0386187 A1* | 11/2023 | Laudereau | G06T 15/506 |
| 2024/0320818 A1* | 9/2024 | Laudereau | G06T 7/001 |

FOREIGN PATENT DOCUMENTS

| | | |
|---|---|---|
| JP | 2004340840 A | 12/2004 |
| JP | 2015163866 A | 9/2015 |
| KR | 20160013337 A | 2/2016 |

OTHER PUBLICATIONS

The International Search Report and the Written Opinion of the International Searching Authority mailed on Mar. 25, 2022, for the counterpart PCT Application No. PCT/EP2021/083705.

Verbiest Frank et al: "Modeling the Effects of Windshield Refraction for Camera Calibration", Aug. 23, 2020 (Aug. 23, 2020), Advances in Intelligent Data Analysis XIX; [Lecture Notes in Computer Science; Lect.Notes Computer], pp. 397-412, XP04 7568576, ISSN: 0302-97 43, ISBN: 978-3-030-71592-2.

Beck Johannes et al: "Generalized B-spline Camera Model", 2018 IEEE Intelligent Vehicles Symposium (IV), IEEE, Jun. 26, 2018 (Jun. 26, 2018), pp. 2137-2142, XP033423365, DOI: 10.1109/IVS. 2018.8500466.

A Notice of Preliminary Rejection was issued on Jun. 20, 2024 for the counterpart Korean Patent Application No. 10-2023-7015757 and machine translation of same.

Notice of Reasons for Refusal drafted Jun. 26, 2024 for the counterpart Japanese Patent Application No. 2023-526913 and machine translation of same.

Pierre-Andre Brousseau et al., "Calibration of Axial Cameras Through Generic Virtual Central Models", 2019 IEEE/CVF International Conference on Computer Vision (ICCV), Date of Conference: Oct. 27, 2019-Nov. 2, 2019, pp. 4040-4048, DOI: 10.1109/ICCV.2019. 00414. Cited in NPL Cite No. 1.

Amit Agrawal et al., "Analytical Forward Projection for Axial Non-central Dioptric and Catadioptric Cameras", 11th European Conference on Computer Vision, Heraklion, Crete, Greece, Sep. 5-11, 2010, Part III, pp. 129-143. Cited in NPL Cite No. 1.

Richard Hartley et al., "Multiple View Geometry in Computer Vision (Second Edition)" Cambridge University Press. 2003, pp. 1-19, 434-497, 597-627, Cited in NPL Cite No. 1.

Written Opinion issued on Aug. 19, 2024 for the counterpart Korean Patent Application No. 10-2023-7015757 and machine translation of same.

Notice of Reasons for Refusal mailed on Jan. 8, 2025 for the counterpart Japanese Patent Application No. 2023-526913 and machine translation of same.

* cited by examiner

METHOD FOR RECTIFICATION OF IMAGES AND/OR IMAGE POINTS, CAMERA-BASED SYSTEM AND VEHICLE

CROSS REFERENCE TO RELATED APPLICATIONS

The present application is a National Stage Application under 35 U.S.C. § 371 of International Patent Application No. PCT/EP2021/083705 filed on Dec. 1, 2021, and claims priority from European Patent Application No. 20213975.4 filed on Dec. 15, 2020, in the European Patent Office, the disclosures of which are herein incorporated by reference in their entireties.

TECHNICAL FIELD

The invention relates to a method for rectification of images and/or image points acquired by at least one camera of a camera-based system of a vehicle with a windshield pane, to a camera-based system for a vehicle and to a vehicle.

BACKGROUND

Computer vision, such as used in advanced driver assistant systems (ADAS), may assign points in space to pixels or areas of an image acquired by a camera. For ADAS, accurate estimates of a projection of the camera are essential for accurately estimating the distance to objects in front of the vehicle. The latter, in turn, is crucial for camera based traffic safety applications like, e.g., automated braking or automated cruise control.

For ADAS purposes in a vehicle, the camera is typically mounted behind the windshield pane in the mirror cover. Evidently, this solves the problem of blocking the camera lenses by dirt or rain. Unfortunately, the particular location of the camera introduces the optical properties of the windshield pane into the projection geometry of the complete optical system. Windshield pane influences can introduce a substantially different behavior of the optical paths compared to that of the coaxially ordered lenses inside the camera optics. Consequently, the optical system of the camera together with the windshield pane can yield significant image deviations compared to the same camera without the windshield pane in front of it. The above class of optical distortions are referred to as windshield pane distortions of the camera image.

The problem of estimation of the projection properties of an optical system including any type of emerging distortions is referred to as camera calibration. Typically, latter process has a parametric character. That is, there is a family of functions—a camera model—customized by a vector of parameters, which for each fixed vector of parameters describes a physical camera device, that is, how points in space are projected onto the image by this particular camera. The vector above is referred then to as the camera parameters.

The application of a camera model in ADAS usually addresses the inverse problem to projection. That is, given a pixel location in the image, the objective is to estimate the set of points in space that are imaged to this particular pixel location. Camera calibration is then utilized as a tool to remove the unwanted influences of the optics in order to describe the optical system by a computationally simple model. This simple model is a pinhole camera, which is in turn essentially the central projection. Further removing the effects of the windshield pane is referred to as image rectification. In particular for stereo imaging, rectification is a major tool to estimate dense distance maps of a scene efficiently. Stereo rectification modifies the images of a system of two different cameras as to come from a parallel system of two optically identical pinhole cameras. In such a system, corresponding object points can be found on the same horizontal image line, which significantly simplifies the search for corresponding points and, consequently, the disparity computation.

Ignoring the impact of the windshield pane distortion can severely obscure the distance estimation to objects, in particular at short distances, in front of the vehicle. Consequently, it is essential to model and estimate the windshield pane distortions.

As an example, European patent application EP 3 293 701 A1 comprises a method for rectification of images acquired by at least one camera of a camera-based system of a vehicle with a windshield pane. The camera-based system is calibrated by placing an imaging target in form of a board with a known pattern in the field of view of a camera of the camera based system, such that the camera can acquire a calibration image of the board through the windshield pane. From this, windshield distortions which are introduced by the windshield pane are calculated. Then, an image is acquired with the camera and a set of points in space that is projected to a location on the image is calculated using the determined windshield distortion. This method, however, is computationally intensive and treats the camera and the windshield pane as one optical system. Hence, for every combination of camera and windshield pane, a new calibration has to be performed.

SUMMARY

It is an object of the present disclosure to provide a method for rectification of images and/or image points acquired by at least one camera of a camera-based system of a vehicle with a windshield pane that is computationally fast and separates the optical effects of the windshield pane and the camera. It is a further object of the present disclosure to provide a camera-based system for a vehicle that is adapted to perform the method and a vehicle including a windshield pane and the camera-based system.

The problem is addressed by the subject-matter of the independent claims. Embodiments are provided by the dependent claims, the following description and the accompanying figures.

According to a first aspect of the present disclosure, a method for rectification of images and/or image points is provided. That is, the method applies to both the rectification of full images and the rectification of some image points of an image, e.g., image points relating to objects of interest, image points relating to very characteristic objects in the image or image points relating to bounding boxes, e.g., of other vehicles or pedestrians.

The images or image points are acquired by at least one camera of a camera-based system of a vehicle with a windshield pane. If the camera-based system includes more than one camera, e.g., stereoscopic information may be obtained by the cameras. The camera is mounted behind the windshield pane, i.e., the windshield is arranged between the camera and the surroundings of the vehicle. Hence, the camera is protected from environmental influences such as rain or dirt.

As a first step of the method, a raw image of a scene is acquired with the camera. The scene may be a traffic scene, including a road, road signs, buildings, pedestrians and/or other vehicles. Since the windshield pane is arranged in front of the camera, light rays from the scene are first deflected by the windshield pane and then focused by an objective lens onto an image sensor. The objective lens may be a wide-angle lens, e.g., a fisheye lens or a rectilinear wide-angle lens. The image sensor may be, e.g., a CMOS sensor or a CCD sensor.

Then, raw image data is selected from the raw image, wherein the raw image data is the full raw image, a part of the raw image or a plurality of raw image points of the raw image. The part of the raw image may be an area of particular interest and the raw image points may relate to objects of interest, to very characteristic objects in the image or to bounding boxes, e.g., of other vehicles or pedestrians.

Based on the raw image data, intermediate image data is calculated. The intermediate image data includes an intermediate image or a plurality of intermediate image points and resembles an image or image points of the scene obtained by a pinhole camera through the windshield pane. In other words, the effects of the objective lens are removed in the intermediate image and replaced by a pinhole camera. To do so, the calculation of the intermediate image data is further based on camera parameters, i.e., on parameters characterizing the objective lens. The details of the calculation are known to the person skilled in the art. By removing the effects of the objective lens in this step, the optical effects of the camera and the windshield pane are separated from one another. Hence, if a different camera is to be used behind a given windshield pane, only the new camera parameters have to be provided and if a camera with known camera parameters is installed behind a different windshield pane, only the effects of the different windshield pane have to be evaluated.

As a last step of the method, a set of points in space of the scene is calculated. The points in space of the scene correspond to pixels of the intermediate image or to the intermediate image points. That is, the points in space of the scene are points in space that, if projected through the windshield pane by a pinhole camera would yield the pixels of the intermediate image or the intermediate image points. For the calculation of the points in space of the scene, a parallel shift of the optical path induced by the windshield pane is used. That is, the effect of the windshield pane is modeled as a parallel shift of the optical path. This is exactly true for plane windshield panes and a very good approximation for windshield panes with only a slight curvature in the region of the camera. The calculation is based on windshield pane parameters and is computationally fast.

Hence, the method provides a rectification of images and/or image points acquired by at least one camera that separates the effects of the windshield pane and the camera and is computationally fast.

According to an embodiment, a sequence of raw images of a scene is acquired with the camera. The sequence is in particular a time-series of images of the scene. In the sequence, the scene changes as objects in the scene move and/or as the vehicle and therefore the camera moves. As the scene changes, the raw image points and/or the intermediate image points are tracked. The set of points in space also changes along with the sequence of raw images and corresponds to the tracked raw image points and/or intermediate image points. By tracking the raw and/or intermediate image points, a distance of the points in space corresponding to the image points may be determined.

According to an embodiment, the windshield pane parameters include a normal vector n of the windshield pane in the region close to the camera, a thickness t of the windshield pane and/or a refraction coefficient v of the windshield pane. The region close to the camera is in particular the region of the windshield pane around the center of vision of the camera. The normal vector n and the thickness t of the windshield pane may be, e.g., determined by geometric measurements.

According to an embodiment, the parallel shift equals to a slab shift $\sigma$ times the normal vector n. This choice of parallel shift results in a very effective and fast computation and can be shown by a direct computation of the optical path.

According to an embodiment, the slab shift $\sigma$ is approximated as a constant. Approximating the slab shift as a constant is computationally extremely fast and provides good results for relatively small angles of view. In particular, the slab shift $\sigma$ is equal to $t(v-1)/v$, which is the exact solution for an optical path that is perpendicular to the windshield pane.

According to an embodiment, the slab shift $\sigma$ is calculated as the root $\sigma_0$ of the quartic $$g(\sigma)=a_4\sigma^4+a_3\sigma^3+a_2\sigma^2+a_1\sigma+a_0,$$

wherein $0 \leq \sigma_0 \leq t$, $a_4=v^2$, $a_3=-2v^2(w+t)$, $a_2=(v^2-1)(u^2+t^2)+v^2w(w+4t)$, $a_1=-2t(v^2(w^2+u^2)+tw(v^2-1)-u^2)$, $-a_0=(v^2-1)t^2(w^2+u^2)$, $w=n\cdot s$ and $u=\sqrt{(s\cdot s-w^2)}$. The point s is the space point of a point in space of the scene which is supposed to correspond to the pixel of the intermediate image or to the intermediate image point. The quartic may be arrived at by computing the optical path from the point s to the origin, at which the pinhole of the pinhole camera is assumed. A rotation of the coordinates to have n in the direction of the $e_3$ axis and s in the $e_1$-$e_3$-plane simplifies the calculation. The quartic may be solved exactly by Ferrari's solution and has a unique solution for $\sigma_0$ in the given range. While this solution is exact and provides the maximal accuracy, it is computationally rather intensive.

According to an embodiment, the slab shift $\sigma$ is calculated as the fixed point of the fixed point equation $\sigma=\varphi(\sigma)$, wherein $\varphi(\sigma)=t(1-1/\sqrt{((v^2-1)(u^2/(w-\sigma)^2+1)+1)})$, $w=n\cdot s$, $u=\sqrt{(s\cdot s-w^2)}$. Again, s is the space point of a point in space of the scene which is supposed to correspond to the pixel of the intermediate image or to the intermediate image point. The fixed point equation may also be arrived at by computing the optical path from the point s to the origin, at which the pinhole of the pinhole camera is assumed. Again, a rotation of the coordinates to have n in the direction of the $e_3$ axis and s in the $e_1$-$e_3$-plane simplifies the calculation. It can be shown that the fixed point equation is a contraction with a Lipschitz constant bounded from above by $c=t/(w-t)$ which is less than one for all practical purposes. Therefore, the fixed point equation converges and a given accuracy may be achieved with a finite number of iterations of the fixed point equation.

According to an embodiment, only one or two iterations of the fixed point equation are computed. This makes the computation of the slab shift $\sigma$ very fast and yet provides very good accuracy.

According to an embodiment, the camera parameters are determined for the camera by acquiring a calibration image of a known pattern that is placed, without the windshield pane, in the field of view of the camera. The known pattern may be, e.g., a checkerboard pattern. The calibration image is then compared to the known pattern, in particular, points of the calibration image are identified with points of the known pattern. Based on the comparison, the camera parameters are determined. The camera parameters may also be determined by performing the above steps for another camera that is similar to the camera. The camera parameters of the other camera are expected to be very similar and for all practical purposes almost identical to the camera parameters of the camera.

According to an embodiment, the windshield pane parameters are determined for the windshield pane by acquiring a calibration image of a known pattern that is placed in the field of view of the camera with the windshield pane in front of the camera. The known pattern may be, e.g., a checkerboard pattern. Based on the calibration image and on the camera parameters, an intermediate calibration is calculated. The intermediate calibration image resembles an image of the known pattern taken by a pinhole camera through the windshield pane. In other words, in the intermediate calibration image, the effects of the camera objective lens are eliminated. The intermediate calibration image is then compared to the known pattern, in particular, points of the intermediate calibration image are identified with points of the known pattern. Based on the comparison, the windshield pane parameters are determined. The influence of the windshield pane on the optical path may be computed as described above. The windshield pane parameters may also be determined by performing the above steps for another windshield pane that is similar to the windshield pane and/or for another camera that is similar to the camera. In all cases, the obtained windshield pane parameters are expected to be very similar and for all practical purposes almost identical to the windshield pane parameters.

According to an embodiment, the windshield pane parameters are determined or improved based on an autocalibration of the camera-based system. The autocalibration is explained, e.g., in the German patent application DE 10 2018 204 451 A1 and will not be detailed here. The autocalibration may, e.g., correct for slight variations in mounting the camera behind the windshield pane.

According to an embodiment, the calculation of the points in space of the scene corresponding to the pixels of the intermediate image or to the intermediate image points is performed by bundle adjustment. This technique is, e.g., described in R. Hartley and A. Zisserman, Multiple View Geometry in Computer Vision, Cambridge, 2nd edition, 2003. The fast method for rectification of the images as described above leads to a fast computation of the points in space.

According to an embodiment, the calculated set of points in space of the scene is used for object recognition, object tracking and/or for advanced driver assistance systems. These are applications that benefit greatly from the fast computation and from the added accuracy by taking the effects of the windshield pane into account.

According to another aspect of the present disclosure, a camera-based system for a vehicle is provided. The camera-based system includes at least one camera to be mounted behind a windshield pane of the vehicle and a computing unit. It is adapted to perform the method according to the above description and hence benefits from the fast computation and the separation of the optical effects of the windshield pane and the camera.

According to yet another aspect of the present disclosure, a vehicle is provided, including a windshield pane and a camera-based system according to the above description.

These and other aspects of the present disclosure will become apparent from and elucidated with reference to the embodiments described hereinafter.

BRIEF DESCRIPTION OF DRAWINGS

Example embodiments of the invention will be described in the following with reference to the following drawings.

The figures are merely schematic representations and serve only to illustrate embodiments of the invention. Identical or equivalent elements are in principle provided with the same reference signs.

DESCRIPTION OF EMBODIMENTS

Figure 1:
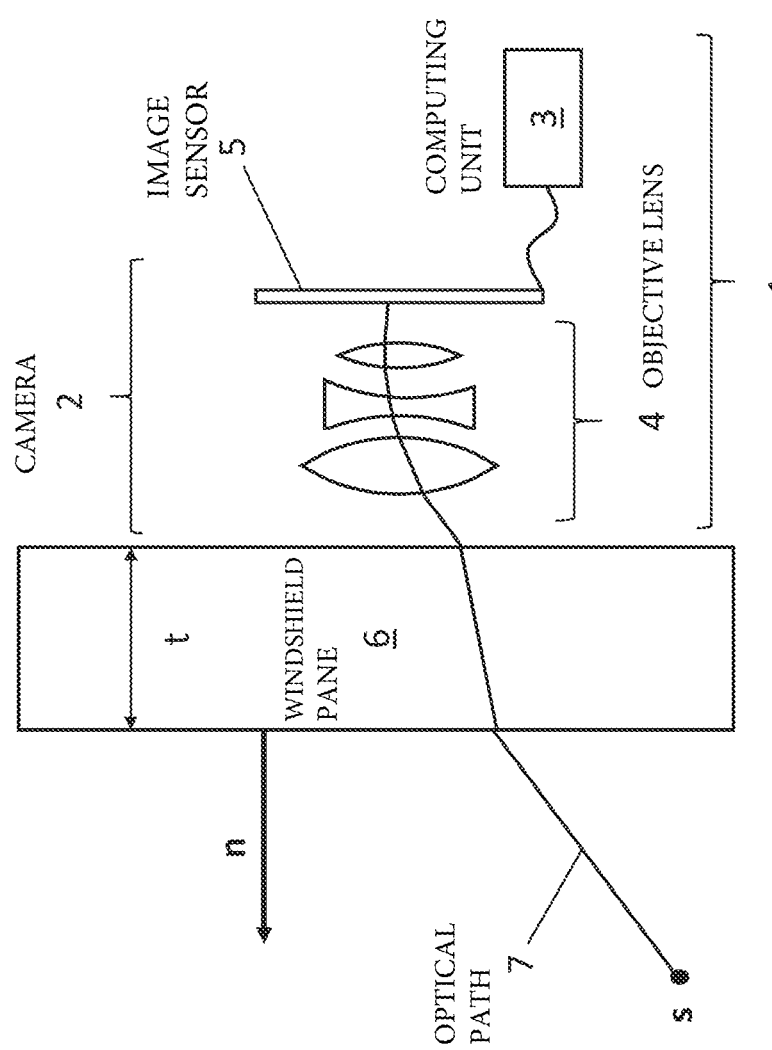
FIG. 1 shows a schematic view of a camera-based system mounted behind a windshield pane.

FIG. 1 shows a schematic view of a camera-based system 1 for a vehicle. The camera-based system 1 includes a camera 2 and a computing unit 3. The camera 2 includes an objective lens 4 and an image sensor 5. The objective lens 4 may be, for example, a fisheye lens or a rectilinear wide-angle lens. The image sensor 5 may be a CMOS sensor or a CCD sensor. That light that is captured by the objective lens 4 is detected by the image sensor 5. The raw image that is obtained that way is then further processed by the computing unit 3.

The camera-based system 1 is mounted behind a windshield pane 6. The windshield pane 6 has a thickness t and an orientation given by the normal vector to the windshield pane n. The windshield pane 6 has further a refractive index v.

Also shown in FIG. 1 is a space point s which is a point in space of a scene. The space point s may, e.g., be a point of particular interest or a corner of a bounding box of, e.g., a pedestrian or another vehicle. Moreover, an optical path 7 of light is shown, emerging from the space point s, being deflected by the windshield pane 6 and being focused by the objective lens 4 on the image sensor 5.

In order to rectify the raw image or some raw image points, an intermediate image data is calculated. The intermediate image data includes an intermediate image or intermediate image points. The intermediate image data is calculated by eliminating the effects of the objective lens 4, wherein the calculation is based on camera parameters, in particular parameters of the objective lens 4.

Figure 2:
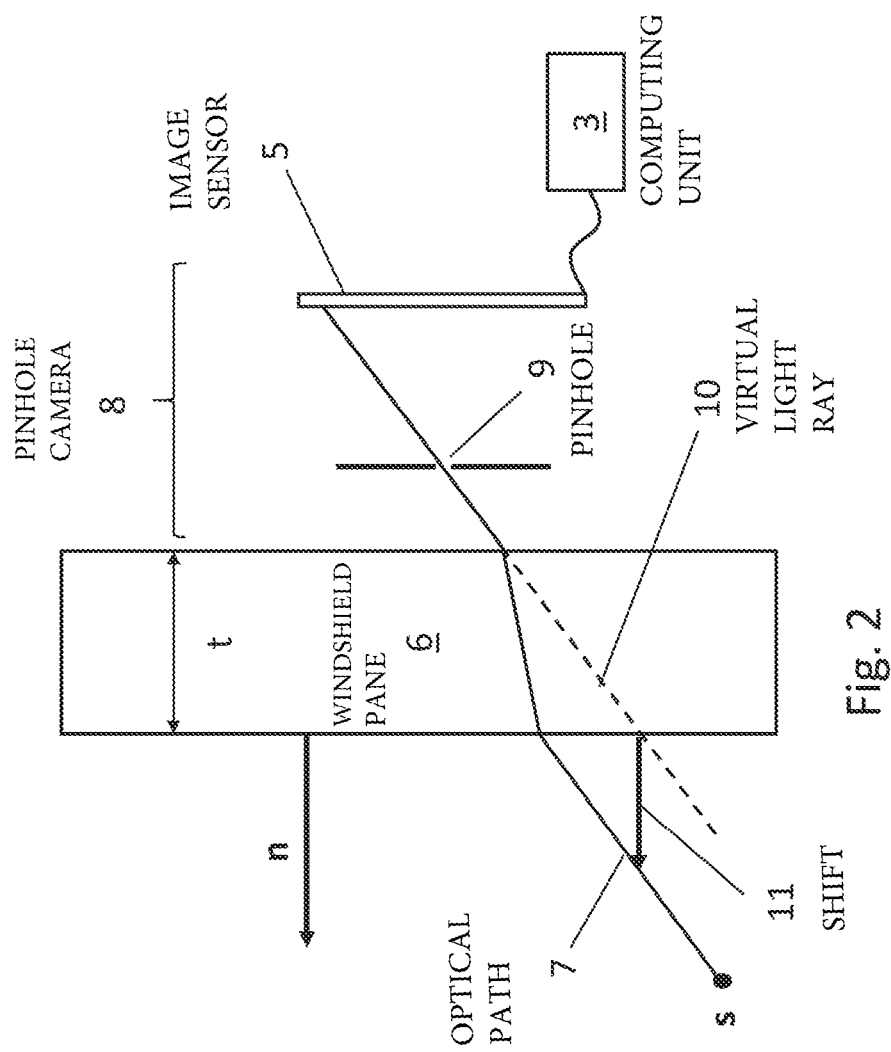
FIG. 2 shows a schematic view of a pinhole camera mounted behind a windshield pane.

The elimination of the effects of the objective lens 4 leads to an image that would be obtained by a pinhole camera 8 instead of the camera 2, as shown in FIG. 2. The optical path 7 of light goes through the pinhole 9 of the pinhole camera 8 and ends on the sensor 5.

Also shown in FIG. 2 is another virtual light ray 10 going through the pinhole 9 and ending on the same point of the sensor 5 as the optical path 7. The virtual light ray 10 is drawn as if the windshield pane 6 did not exist.

On the side of the windshield pane 6 opposite to the pinhole camera 8, there is a parallel shift 11 of the optical path 7 compared to the virtual light ray. The parallel shift 11 equals to a slab shift $\sigma$ times the normal vector n.

The slab shift $\sigma$ may be approximated as a constant, in particular as $t(v-1)/v$. This approximation is computationally extremely fast but sufficiently accurate only for small angles of incidence.

Alternatively, the slab shift $\sigma$ may be calculated as the root $\sigma_0$ of the quartic $$g(\sigma)=a_4\sigma^4+a_3\sigma^3+a_2\sigma^2+a_1\sigma+a_0,$$

wherein $0 \leq \sigma_0 \leq t$, $a_4=v^2$, $a_3=-2v^2(w+t)$, $a_2=(v^2-1)(u^2+t^2)+v^2w(w+4t)$, $a_1=-2t(v^2(w^2+u^2)+tw(v^2-1)--u^2$, $a_0=(v^2-1)t^2(w^2+u^2)$, $w=n \cdot s$ and $u=\sqrt{(s \cdot s-w^2)}$. This calculation leads to a perfectly accurate result but is computationally very intensive.

As yet another alternative, the slab shift $\sigma$ may be calculated as the fixed point of the fixed point equation $\sigma=\varphi(\sigma)$, wherein $\varphi(\sigma)=t(1-1/\sqrt{((v^2-1)(u^2/(w-\sigma)^2+1)+1)})$ and w and u as above. One or two iterations of this convergent fixed point equation yield very accurate results and are computationally fast.

Once the parallel shift 11 is known, the optical path 7 can be traced back and the point in space s may be calculated, further using, e.g., bundle adjustment or stereoscopic vision.

Figure 3:
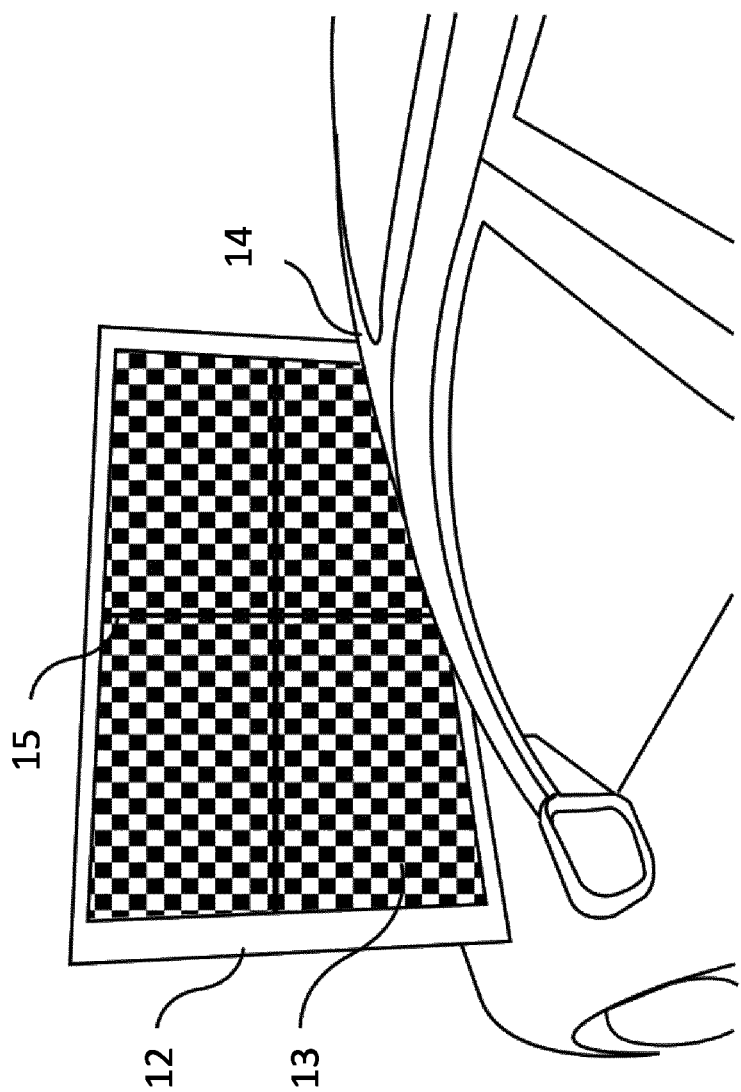
FIG. 3 shows a schematic view of a calibration setup.

FIG. 3 shows a setup for the determination of the windshield pane parameters. A chart 12 with a known pattern 13 is mounted in front of a vehicle 14 which includes a windshield pane 6 and a camera-based system 1 mounted behind the windshield pane 6. A calibration image of the known pattern 13 is acquired by the camera-based system 1. Using the already known camera parameters, an intermediate calibration image is calculated from the calibration image, wherein the intermediate calibration image resembles an image of the known pattern 13 taken by a pinhole camera 8 through the windshield pane 6. Then, a set of points 15 of the known pattern 13 are identified and compared with pixels in the intermediate calibration image. Based on the comparison, the windshield pane parameters are obtained.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. Method for rectification of images and/or image points acquired by at least one camera of a camera-based system of a vehicle with a windshield pane, the method comprising:
   acquiring a raw image of a scene with the camera;
   selecting raw image data from the raw image, wherein the raw image data is the full raw image, a part of the raw image or a plurality of raw image points of the raw image;
   calculating intermediate image data based on the raw image data and on camera parameters, wherein the intermediate image data comprises an intermediate image or a plurality of intermediate image points and wherein the intermediate image data resembles an image or image points of the scene obtained by a pinhole camera through the windshield pane; and
   calculating a set of points in space of the scene corresponding to pixels of the intermediate image or to the intermediate image points, using a parallel shift of an optical path induced by the windshield pane based on windshield pane parameters.

2. Method according to claim 1, wherein
   a sequence of raw images of a scene is acquired with the camera;
   the raw image points and/or the intermediate image points are tracked; and
   the set of points in space corresponds to the tracked raw image points or intermediate image points.

3. Method according to claim 1, wherein the windshield pane parameters comprise at least one of a normal vector n of the windshield pane in a region close to the camera, a thickness t of the windshield pane or a refraction coefficient v of the windshield pane.

4. Method according to claim 3, wherein the parallel shift equals to a slab shift $\sigma$ times the normal vector n.

5. Method according to claim 4, wherein the slab shift $\sigma$ is approximated as a constant, in particular the slab shift $\sigma$ is equal to $t(v-1)/v$.

6. Method according to claim 4, wherein the slab shift $\sigma$ is calculated as a root $\sigma_0$ of the quartic $g(\sigma)=a_4\sigma^4+a_3\sigma^3+a_2\sigma^2+a_1\sigma+a_0$, wherein $0\leq\sigma_0\leq t$, $a_4=v^2$, $a_3=-2v^2(w+t)$, $a_2=(v^2-1)(u^2+t^2)+v^2w(w+4t)$, $a_1=-2t(v^2(w^2+u^2)+tw(v^2-1)-u^2)$, $a_0=(v^2-1)t^2(w^2+u^2)$, $w=n\cdot s$, $u=\sqrt{(s\cdot s-w^2)}$ and s is the space point of a point in space of the scene.

7. Method according to claim 4, wherein the slab shift $\sigma$ is calculated as a fixed point of a fixed point equation $\sigma=\varphi(\sigma)$, wherein $\varphi(\sigma)=t(1-1/\sqrt{((v^2-1)(u^2/(w-\sigma)^2+1)+1)})$, $w=n\cdot s$, $u=\sqrt{(s\cdot s-w^2)}$ and s is the space point of a point in space of the scene.

8. Method according to claim 7, wherein only one or two iterations of the fixed point equation are computed.

9. Method according to claim 1, wherein the camera parameters are determined for the camera or for another camera that is similar to the camera by
   acquiring a calibration image of a known pattern that is placed, without the windshield pane, in a field of view of the camera or the other camera,
   comparing the calibration image to the known pattern, and
   determining the camera parameters from the comparison.

10. Method according to claim 1, wherein the windshield pane parameters are determined for the windshield pane or for another windshield pane that is similar to the windshield pane by
    acquiring a calibration image of a known pattern that is placed in a field of view of the camera or another camera that is similar to the camera with the windshield pane or other windshield pane in front of the camera or other camera,
    calculating an intermediate calibration image based on the calibration image and on the camera parameters, wherein the intermediate calibration image resembles an image of the known pattern taken by a pinhole camera through the windshield pane,
    comparing the intermediate calibration image to the known pattern and
    determining the windshield pane parameters from the comparison.

11. Method according to claim 1, wherein the windshield pane parameters are determined or improved based on an autocalibration of the camera-based system.

12. Method according to claim 1, wherein the calculation of the points in space of the scene corresponding to the pixels of the intermediate image or to the intermediate image points is performed by bundle adjustment.

13. Method according to claim 1, wherein the calculated set of points in space of the scene is used for at least one of object recognition, object tracking, or for advanced driver assistance systems.

14. Camera-based system for a vehicle, comprising at least one camera to be mounted behind a windshield pane of the vehicle and a computing unit, wherein the camera-based system is adapted to perform the method according to claim 1.

15. Vehicle, comprising a windshield pane and a camera-based system according to claim 14.

* * * * *